United States Patent [19]
Schell, Jr. et al.

[11] Patent Number: 5,045,612
[45] Date of Patent: Sep. 3, 1991

[54] CATALYST AND PROCESS FOR POLYMERIZING OLEFINS

[75] Inventors: Joseph G. Schell, Jr.; Larry A. Meiske; Gary R. Marchand, all of Baton Rouge, La.

[73] Assignee: The Dow Chemical Company, Midland, Mich.

[21] Appl. No.: 510,492

[22] Filed: Apr. 18, 1990

[51] Int. Cl.$^5$ ............................................. C08F 4/646
[52] U.S. Cl. ..................... 526/124; 526/142; 526/352; 502/111; 502/115; 502/125
[58] Field of Search ................................ 526/124, 142

[56] References Cited

U.S. PATENT DOCUMENTS

| | | | |
|---|---|---|---|
| 2,956,993 | 10/1960 | Nowlin et al. | 260/94.9 |
| 3,334,079 | 8/1967 | Ralch | 260/93.7 |
| 3,478,008 | 11/1969 | Ledbetter | 260/93.7 |
| 3,644,318 | 2/1972 | Diedrich et al. | 260/88.2 |
| 3,718,636 | 2/1973 | Stevens et al. | 260/94.9 D |
| 3,878,124 | 4/1975 | Durand et al. | 252/429 B |
| 3,901,863 | 8/1975 | Berger et al. | 260/88.2 R |
| 3,917,575 | 11/1975 | Matsuura et al. | 260/88.2 R |
| 3,951,935 | 4/1976 | Engelmann | 252/429 C X |
| 3,960,765 | 6/1976 | Shiga et al. | 252/429 B |
| 4,004,071 | 1/1977 | Aishima et al. | 252/429 C X |
| 4,006,101 | 2/1977 | Matsuura et al. | 252/429 C |
| 4,027,089 | 5/1977 | Aishima et al. | 252/429 B X |
| 4,039,472 | 8/1977 | Hoff | 252/429 C |
| 4,063,009 | 12/1977 | Ziegler et al. | 526/159 |
| 4,067,822 | 1/1978 | Gessell et al. | 252/429 B |
| 4,071,672 | 1/1978 | Kashiwa | 252/429 B X |
| 4,083,802 | 4/1978 | Matsuura et al. | 252/429 C |
| 4,085,276 | 4/1978 | Toyota et al. | 252/429 B X |
| 4,104,198 | 8/1978 | May, Jr. et al. | 252/429 B |
| 4,105,846 | 8/1978 | Hoff et al. | 252/431 R X |
| 4,115,319 | 9/1978 | Scata et al. | 252/429 B |
| 4,120,820 | 10/1978 | Birkelbach | 252/429 B |
| 4,120,883 | 10/1978 | Sakurai et al. | 260/448 A |
| 4,136,058 | 1/1979 | Harris et al. | 252/429 B |
| 4,144,390 | 3/1979 | Derroitte et al. | 252/429 R X |
| 4,159,256 | 6/1979 | Sakurai et al. | 252/429 B |
| 4,163,831 | 8/1979 | Gessell | 252/429 C X |
| 4,172,050 | 10/1979 | Gessell | 252/431 R |
| 4,187,385 | 2/1980 | Iwao et al. | 252/429 B X |
| 4,189,553 | 2/1980 | Birkelbach | 252/429 B X |
| 4,199,473 | 4/1980 | Timms | 252/429 C |
| 4,199,476 | 4/1980 | Melquist et al. | 252/431 R |
| 4,244,838 | 1/1981 | Gessell | 252/429 B |
| 4,246,383 | 1/1981 | Gessell | 252/428 X |
| 4,255,280 | 3/1981 | Sakurai et al. | 252/429 B |
| 4,263,168 | 4/1981 | Rochefort et al. | 252/429 B |
| 4,283,515 | 8/1981 | Gibbs | 252/429 B X |
| 4,295,992 | 10/1981 | Gibbs | 252/429 C |
| 4,296,223 | 10/1981 | Berger | 252/429 R |
| 4,308,369 | 12/1981 | Shipley et al. | 526/122 |
| 4,319,011 | 3/1982 | Lowery, Jr. et al. | 526/137 |
| 4,323,665 | 4/1982 | Lowery, Jr. et al. | 526/122 |
| 4,324,691 | 4/1982 | Hartshorn et al. | 252/429 B |
| 4,387,200 | 6/1983 | Gessell et al. | 526/122 |
| 4,426,316 | 1/1984 | Gessell | 502/ |
| 4,496,660 | 1/1985 | Gessell et al. | 502/111 |
| 4,526,943 | 7/1985 | Fuentes, Jr. et al. | 526/133 |
| 4,544,647 | 10/1985 | Fuentes, Jr. et al. | 502/115 |
| 4,661,465 | 4/1987 | Fuentes et al. | 502/111 |
| 4,783,512 | 11/1988 | Gessell | 526/142 |
| 4,910,272 | 3/1990 | Marchand et al. | 526/142 X |

FOREIGN PATENT DOCUMENTS

| | | |
|---|---|---|
| 845983 | 3/1977 | Belgium . |
| 942734 | 2/1974 | Canada . |
| 0000007 | 6/1978 | European Pat. Off. . |
| 2758312 | 7/1978 | Fed. Rep. of Germany . |
| 51-102086 | 9/1976 | Japan . |
| 51-111281 | 10/1976 | Japan . |
| 51-148785 | 12/1976 | Japan . |
| 52-98076 | 8/1977 | Japan . |
| 1358437 | 7/1934 | United Kingdom . |
| 1275641 | 12/1969 | United Kingdom . |
| 1235062 | 6/1971 | United Kingdom . |
| 1306001 | 2/1973 | United Kingdom . |
| 1309987 | 3/1973 | United Kingdom . |
| 1311013 | 3/1973 | United Kingdom . |
| 1315770 | 5/1973 | United Kingdom . |
| 1321766 | 6/1973 | United Kingdom . |
| 1343781 | 1/1974 | United Kingdom . |
| 1357474 | 6/1974 | United Kingdom . |
| 1444736 | 8/1976 | United Kingdom . |
| 1464909 | 2/1977 | United Kingdom . |
| 1492379 | 11/1977 | United Kingdom . |
| 1500873 | 2/1978 | United Kingdom . |
| 1502567 | 3/1978 | United Kingdom . |
| 1504930 | 3/1978 | United Kingdom . |
| 1538472 | 1/1979 | United Kingdom . |
| 1539175 | 1/1979 | United Kingdom . |
| 1547269 | 6/1979 | United Kingdom . |
| 2016020 | 9/1979 | United Kingdom . |
| 1554248 | 10/1979 | United Kingdom . |
| 2020672 | 11/1979 | United Kingdom . |

OTHER PUBLICATIONS

Derwent Abstract of Japanese J56104908.
Derwent Abstract of Japanese J56141304.
Derwent Abstract of Japanese J56166206.
Chemical Abstract of Japanese Kokai JP81147808.
"Ethylene Polymerization Process with a Highly Active Ziegler–Natta Catalyst: 1. Kinetics", L. L. Bohm, *Polymer*, vol. 19, May, 1978, pp. 553–561.

*Primary Examiner*—Patrick P. Garvin

[57] ABSTRACT

Olefins are polymerized under solution polymerization conditions in the presence of the solid catalytic product resulting from removing the liquid components from the product resulting from admixing in an inert diluent and in an atmosphere which excludes moisture and oxygen (A) at least one hydrocarbon soluble organomagnesium compound; (B) at least one organic hydroxyl-containing compound; (C) at least one reducing halide source; (D) at least one transition metal (Tm) alkoxide.

14 Claims, No Drawings

CATALYST AND PROCESS FOR POLYMERIZING OLEFINS

FIELD OF THE INVENTION

The present invention concerns magnesium halide supported titanium alkoxide catalysts for polymerizing olefins.

BACKGROUND OF THE INVENTION

Fuentes, Jr. et al. in U.S. Pat. No. 4,526,943 discloses a catalyst for polymerizing olefins which catalyst has been prepared by mixing a hydrocarbon soluble organomagnesium compound, an organic hydroxyl containing compound, a reducing halide and a transition metal compound. The catalyst is employed as it is prepared without separating the liquid components from the solid components. The catalyst is reported to be suitable for the polymerization of olefins at a temperature of from 0° C. to 300° C. which temperature range includes both the slurry and solution processes. For some applications it would be desirable to have a catalyst which is both efficient in terms of weight of polymer produced per weight of halide contained in the catalyst and wherein the resultant polymer possesses a broader molecular weight distribution so as to provide for better processing during extrusion of the polymer.

SUMMARY OF THE INVENTION

One aspect of the present invention pertains to the solid catalytic product resulting from removing the liquid components from the product resulting from admixing in an inert diluent and in an atmosphere which excludes moisture and oxygen (A) at least one hydrocarbon soluble organomagnesium compound;

(B) at least one organic hydroxyl-containing compound;

(C) at least one reducing halide (X) source;

(D) at least one transition metal (Tm) alkoxide; and wherein (a) the components are added in the order (A), (B), (C) and (D) or (A), (B), (D) and (C); and (b) the components are employed in quantities so as to provide the following atomic ratios
Mg:Tm of from about 0.01:1 to about 100:1; and
X:Mg of from about 3:1 to about 20:1; and (c) the organic hydroxyl-containing compound is employed in a quantity such that for every metal atom present in component (A) there remains on the average no more than about 0.9 hydrocarbyl or hydrocarbyloxy group attached to such metal atoms.

Another aspect of the present invention pertains to a process for preparing a catalyst which process comprises (1) contacting (A) at least one organomagnesium compound with (B) at least one organic hydroxyl-containing compound by the slow addition of the organic hydroxyl-containing compound to the organomagnesium compound and in a quantity such that for every metal atom present in component (A) there remains on the average no more than about 0.9 hydrocarbyl or hydrocarbyloxy group attached to such metal atoms;

(2) contacting the product resulting from step (1) with either one, but not both of (C) at least one reducing halide (X) source or (D) at least one transition metal (Tm) alkoxide; and (3) contacting the product resulting from step (2) with whichever component (C) or (D) was not employed in step (2); and wherein the components are employed in quantities corresponding to the atomic ratios of Mg:Tm of from about 0.1:1 to about 100:1; and X:Mg of from about 3:1 to about 20:1 where X is a halide.

A further aspect of the present invention pertains to a process for polymerizing one or more α-olefins or one or more α-olefins and one or more polymerizable ethylenically unsaturated monomers which process comprises conducting the polymerization in the presence of the aforementioned catalyst under solution polymerization conditions.

The catalysts of the present invention provide polymers produced by the solution process with a broader molecular weight distribution and higher chloride and/or aluminum efficiencies than does the corresponding catalyst wherein the solid portion is not separated from the liquid portion of the catalyst.

DETAILED DESCRIPTION OF THE INVENTION

The catalyst of the present invention can be prepared by admixing in a suitable inert diluent at a temperature suitably from about 0° C. to the boiling point of the diluent, more suitably from about 10° C. to about 55° C., most suitably from about 25° C. to about 45° C. the magnesium compound and the hydroxyl-containing compound. The organic hydroxyl-containing compound, depending on the amount, is usually slowly added to the magnesium compound over a period suitably from about 10 minutes to several hours. Regardless of when component (C), the reducing halide source, is admixed, it is added at a temperature of from about 0° C. to the boiling point of the diluent, more suitably from about 10° C. to about 55° C., most suitably from about 25° C. to about 45° C. The time employed to add component (C) is suitably from about 30 minutes to about 24 hours, more suitably from about 1 hour to about 18 hours, most suitably from about 2 hours to about 12 hours. Regardless of when component (D), the transition metal alkoxide, is added, it is added at a temperature of from about 0° C. to about 80° C., more suitably from about 10° C. to about 55° C., most suitably from about 25° C. to about 45° C. The time employed in this reaction is that which is sufficient to add all of the reagent.

The organic hydroxyl-containing compound which can be reacted with the magnesium compound is that amount which will result in there being, on the average, not more than about 0.9, preferably from about 0.3 to about 0.9, more preferably from about 0.5 to about 0.9 hydrocarbyl or hydrocarbyloxy group attached to any metal atom contained in the organomagnesium compound, component (A).

The reducing halide is employed in an amount which will provide an atomic ratio of halide (X) atoms to magnesium atoms (X:Mg) from the organomagnesium compound suitably from about 3:1 to about 20:1, more suitably from about 6:1 to about 20:1, most suitably from about 8:1 to about 12:1.

The transition metal alkoxide is suitably employed in an amount which will provide an atomic ratio of Mg:Tm suitably from about 0.1:1 to about 100:1, more suitably from about 1:1 to about 40:1, most suitably from about 5:1 to about 20:1.

The organomagnesium compounds which can suitably be employed in the present invention include those represented by the formula $R_2Mg \cdot xMeR'_{x'}$ wherein each R is independently a hydrocarbyl group having from 1 to about 20 carbon atoms; each R' is independently hydrogen, a hydrocarbyl or a hydrocarbyloxy group having from 1 to about 20 carbon atoms; Me is Al, Zn or B; x has a value suitably from zero to about 10, more suitably from about 0.2 to about 5, more suitably from about 0.3 to about 2; and x' has a value equal to the valence of Me.

The term hydrocarbyl as employed herein refers to a monovalent hydrocarbon group such as alkyl, cycloalkyl, aryl, aralkyl, alkenyl and similar hydrocarbon groups having from 1 to about 20 carbon atoms with alkyl having from 1 to about 10 carbon atoms being preferred.

The term hydrocarbyloxy as employed herein refers to a monovalent oxyhydrocarbon group such as alkoxy, cycloalkoxy, aryloxy, alkyl substituted aryloxy, aryl substituted alkoxy; alkenoxy and similar oxyhydrocarbon groups having from 1 to about 20 carbon atoms with alkoxy having from 1 to about 10 carbon atoms being preferred.

The quantity of $MeR'_{x'}$, i.e. the value of x, is preferably the minimum amount which is sufficient to render the magnesium compound soluble in the inert solvent or diluent which is usually a hydrocarbon or mixture of hydrocarbons. The value of x therefore is from zero to about 10, usually from about 0.2 about 2.

Particularly suitable organomagnesium compounds include, for example, di-(n-butyl) magnesium, n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-(n-octyl) magnesium, butyl octyl magnesium and such complexes as di-n-butyl magnesium·⅓ aluminum triethyl, di-(n-butyl) magnesium.1/6 aluminum triethyl, n-butyl-sec-butyl magnesium·½ triisobutylaluminum, butyl ethyl magnesium·½ triisobutylaluminum, butyl ethyl magnesium·¼ triisobutylaluminum, butyl octyl magnesium·¼ triisobutylaluminum, dihexylmagnesium·½ triisobutylaluminum, mixtures thereof and the like.

Suitable hydroxyl-containing organic compounds include, for example, alcohols, glycols, polyoxyalkylene glycols, mixtures thereof and the like.

Suitable such compounds include those represented by the formulas $R^a\text{-}(O\text{-}R^b)_n\text{-}OH$ 10 and 10 $Z\text{-}(O\text{-}R^b)_n\text{-}O\text{-}R^c)_{n'}$
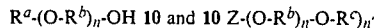

wherein each $R^a$ is a hydrocarbyl group having from 1 to about 20, preferably from 1 to about 10, carbon atoms or a hydrogen; each $R^b$ is independently a divalent hydrocarbyl group having from 1 to about 20, preferably from 1 to about 10, carbon atoms; each $R^c$ is independently hydrogen or a hydrocarbyl group having from 1 to about 20, preferably from 1 to about 10, carbon atoms, at least one of which is hydrogen; Z is a multivalent organic group containing from 2 to about 20 carbon atoms; n has a value from zero to about 10; and n' has a value of from 2 to about 10.

Particularly suitable organic hydroxyl-containing compounds include alcohols such as for example methyl alcohol, ethyl alcohol, n-propyl alcohol, isopropyl alcohol, n-butyl alcohol, sec-butyl alcohol, tert-butyl alcohol, 2-pentanol, n-octyl alcohol, octadecyl alcohol, glycols, 1,2-butylene glycol, 1,3-propylene glycol, 1,4-butanediol, 1,6-hexane diol, other hydroxyl-containing compounds such as, for example, glycerine, trimethylol propane, hexane triol, phenol, 2,6-di-tert-butyl-4-methylphenol, mixtures thereof and the like. Also suitable are the adducts of ethylene oxide, 1,2-propylene oxide, 1,2-butylene oxide, 2,3-butylene oxide, styrene oxide or mixtures of such oxides with the previously mentioned or other hydroxyl-containing compounds such as pentaerythritol, sucrose, sorbitol and the like, as well as the alkyl and aryl capped hydroxyl-containing compounds so long as there remains at least 1 hydroxyl group per molecule.

Suitable reducing halide sources include those represented by the formulas $Al(R^1)_{3-m}X_m$ 10 and 10 $B(R^1)_{3-m}X_m$
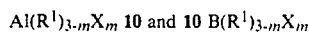

including mixtures thereof wherein each $R^1$ is independently hydrogen or a hydrocarbyl group as hereinbefore defined, and m has a value from 1 to 2.

Particularly suitable reducing halides include, for example, ethylaluminum dichloride, diethylaluminum chloride, ethylaluminum sesquichloride, ethylboron dichloride, diethylboron chloride, mixtures thereof and the like.

Suitable transition metal compounds which can be employed include those represented by the formula

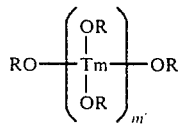

wherein Tm is a transition metal in its highest stable valence state and being selected from groups IV-B, V-B and VI-B of the Periodic Table of the Elements; R is a hydrocarbyl group having from 1 to about 20 carbon atoms, preferably from 1 to about 10; and m' has a value from 1 to about 20, preferably from 1 to about 10.

Particularly suitable transition metal compounds include, for example, tetraisopropoxy-titanium, tetrabutyoxytitanium, tetra(2-ethylhexoxy)titanium, isopropyltitanate decamer, mixtures thereof and the like.

Suitable organic inert diluents in which the catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane, dimethylcyclohexane, dodecane, eicosane industrial solvents composed of saturated or aromatic hydrocarbon such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

The polymerization is usually conducted also in the presence of a suitable cocatalyst or activator compound.

Suitable cocatalysts or activators with which the catalysts of the present invention can be reacted, contacted or employed in the polymerization of α-olefins includes those aluminum, boron, zinc or magnesium compounds represented by the formulas $Al(R^1)_{3-a}X'_a$, $B(R^1)_{3-a}X'_a$, $MgR^1_2$, $MgR^1X'$, $ZnR^1_2$, or mixtures thereof wherein $R^1$ is as previously defined; $X'$ is a halogen, preferably chlorine or bromine; and $a$ has a value of from zero to 2, preferably zero to 1 and most preferably zero.

Particularly suitable cocatalysts or activators include, for example, diethylaluminum chloride, ethylaluminum dichloride, diethylaluminum, bromide, triethylaluminum, triisobutylaluminum, diethylzinc, dibutylmagnesium, butylethylmagnesium, butylmagnesium chloride, diisobutylaluminum hydride, isoprenylaluminum, triethylboron, trimethylaluminum, mixtures thereof and the like.

The cocatalysts or activators are employed in quantities such that the atomic ratio of the Al, B, Mg, Zn or mixtures thereof to Tm is from about 0.1:1 to about 1000:1, preferably from about 5:1 to 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic $\alpha$-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that $\alpha$-olefins may be copolymerized with one or more other $\alpha$-olefins and/or with small amounts i.e., up to about 25 weight percent based on the polymer of other polymerizable ethylenically unsaturated monomers such as styrene, $\alpha$-methylstyrene and similar ethylenically unsaturated monomers which do not destroy conventional Ziegler catalysts. Most benefits are realized in the polymerization of aliphatic $\alpha$-monoolefins, particularly ethylene and mixtures of ethylene and up to 50 weight percent, especially from about 0.1 to about 40 weight percent of propylene, butene-1, hexene-1, octene-1, 4-methylpentene-1, 1,7-octadiene or similar $\alpha$-olefin or $\beta$-diolefin based on total monomer.

In the polymerization process employing the aforementioned catalytic reaction product, polymerization is effected by adding a catalytic amount of the catalyst composition to a polymerization zone containing $\alpha$-olefin monomer, or vice versa. The polymerization zone is maintained at temperatures which will result in a solution of the polymer being formed in the reaction medium, in other words any temperature which results in providing solution polymerization conditions at the pressure being employed. The temperature is such that the polymerization is conducted under solution conditions. Suitable such temperatures are in the range of from about 95 13°· C. to about 300° C., more suitably from about 150° C. to about 250° C., most suitably from about 160° C. to about 230° C., for a residence time of from about 15 minutes to about 24 hours, preferably from about 30 minutes to about 8 hours. It is generally desirable to carry out the polymerization in the absence of moisture and oxygen and a catalytic amount of the catalytic reaction product is generally within the range from about 0.0001 to about 0.1 milligram-atoms, transition metal per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the catalyst of the present invention, care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 10 to about 500 psig. However, polymerization within the scope of the present invention can occur at pressures from atmospheric up to pressures determined by the capabilities of the polymerization equipment. During polymerization it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the bessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present and thus remove the heat of reaction In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

EXAMPLE 1

Catalyst Preparation

To a stirred vessel containing 807 grams hexane are added, sequentially, 114 grams of a 14.7% butylethylmagnesium solution in hexane, 61 grams of a 25.1% triisobutylaluminum solution in hexane, 25 grams n-propyl alcohol, 9 grams of a 50% tetraisopropoxy-titanium solution in hexane, and 747 grams of a 13.1% ethylaluminumdichloride solution in hexane. The temperature is held at 35° C. throughout the preparation. The molar ratio of ROH:R, i.e., total amount of alcohol per R groups attached to butylethylmagnesium and triisobutylaluminum is 0.78:1.0. Molar ratios of the components are 1.0 butylethylmagnesium to 0.50 triisobutylaluminum to 2.75 n-propyl alcohol to 0.10 tetraisopropoxy-titanium to 5.1 ethylaluminumdichloride. Elemental ratios are 1.0 Mg to 0.1 Ti to 5.6 Al to 10.2 Cl. Two hundred ml of this catalyst are collected while it is being stirred, in a capped bottle previously purged with nitrogen. The hydrocarbon insoluble solids are allowed to settle in the bottle and approximately 100 ml of the supernatant solution is removed by decantation. The solids are reslurried with fresh hexane. The decantation procedure is repeated again to remove the hexane soluble reaction products.

Polymerization of Ethylene

To a stirred 1-gallon stainless steel reactor is added 2 liters of dry, oxygen-free ISOPAR E TM. The pressure is adjusted to 2 psig (13.79 kPa) with hydrogen. The reactor contents are heated to 190° C. Ethylene is added to the reactor at 400 psig (2757.9 kPa) A 15.4 milliliter aliquot (containing 0.01 millimole Ti) of a mixture of 5 milliliters of the above decanted catalyst, 0.16 milliliters 640 millimolar triethylaluminum, and 45 milliliters ISOPAR E TM is pressured into the reactor. The pressure is maintained at 400 psig (2757.9 kPa) by ethylene flow for 20 minutes. The polyethylene sample is collected and the ISOPAR TM E is flashed off under vacuum at 80° C. The dried polyethylene weighs 129 grams and has a melt index of 2.77 and an $I_{10}/I_2$ of 10.9. Catalyst efficiencies are 270,000 grams polyethylene/gram Ti; 53,000 grams polyethylene/gram Mg; 152,000 grams polyethylene/gram Al; and 14,000 grams polyethylene/gram Cl.

COMPARATIVE EXPERIMENT A

Catalyst Preparation

To a stirred vessel containing 807 grams hexane are added, sequentially, 114 grams of a 14.7% butylethylmagnesium solution in hexane, 61 grams of a 25.1% triisobutylaluminum solution in hexane, 25 grams n-propyl alcohol, 9 grams of a 50% tetraisopropoxy-titanium solution in hexane, and 747 grams of a 13.1% ethylaluminumdichloride solution in hexane. The temperature is held at 35° C. throughout the preparation. The molar ratio of ROH:R, i.e., total amount of alcohol per R groups attached to butylethylmagnesium and triisobutylaluminum is 0.78:1.0. Molar ratios of the components are 1.0 butylethylmagnesium to 0.50 triisobutylaluminum to 2.75 n-propyl alcohol to 0.10 tetraisopropoxy-titanium to 5.1 ethylaluminumdichloride. Elemental ratios are 1.0 Mg to 0.1 Ti to 5.6 Al to 10.2 Cl.

Polymerization of Ethylene

To a stirred 1-gallon stainless steel reactor is added 2 liters of dry, oxygen-free ISOPAR E TM. The pressure is adjusted to 2 psig (13.79 kPa) with hydrogen. The reactor contents are heated to 190° C. Ethylene is added to the reactor at 400 psig (2757.9 kPa). A 15.4 milliliter aliquot (containing 0.01 millimole Ti) of a mixture of 5 milliliters of the above non-decanted catalyst, 0.16 milliliters 640 millimolar triethylaluminum, and 45 milliliters ISOPAR E TM is pressured into the reactor. The pressure is maintained at 400 psig (2757.9 kPa) by ethylene flow for 20 minutes The polyethylene sample is collected and the ISOPAR TM E is flashed off under vacuum at 80° C. The dried polyethylene weighs 121 grams and has a melt index of 1.36 and an $I_{10}/I_2$ of 9.6. Catalyst efficiencies are 252,000 grams polyethylene/gram Ti; 49,800 grams polyethylene/gram Mg; 8,100 grams polyethylene/gram Al; and 3,400 grams polyethylene/gram Cl.

EXAMPLE 2

Catalyst Preparation

To a stirred vessel containing 807 grams hexane are added, sequentially, 114 grams of a 14.7% butylethylmagnesium solution in hexane, 61 grams of a 25.1% triisobutylaluminum solution in hexane, 25 grams n-propyl alcohol, 9 grams of a 50% tetraisopropoxy-titanium solution in hexane, and 747 grams of a 13.1% ethylaluminumdichloride solution in hexane. The temperature is held at 35° C. throughout the preparation. The molar ratio of ROH:R, i.e., total amount of alcohol per R groups attached to butylethylmagnesium and triisobutylaluminum is 0.78:1.0. Molar ratios of the components are 1.0 butylethylmagnesium to 0.50 triisobutylaluminum to 2.75 n-propyl alcohol to 0.10 tetraisopropoxy-titanium to 5.1 ethylaluminumdichloride. Elemental ratios are 1.0 Mg to 0.1 Ti to 5.6 Al to 10.2 Cl. Two hundred ml of this catalyst are collected while it is being stirred, in a capped bottle previously purged with nitrogen. The hydrocarbon insoluble solids are allowed to settle in the bottle and approximately 100 ml of the supernatant solution is removed by decantation. The solids are reslurried with fresh hexane. The decantation procedure is repeated again to remove the hexane soluble reaction products.

Polymerization of Ethylene

To a stirred 1-gallon stainless steel reactor is added 2 liters of dry, oxygen-free ISOPAR E TM. The pressure is adjusted to 2 psig (13.79 kPa) with hydrogen. The reactor contents are heated to 190° C. Ethylene is added to the reactor at 400 psig (2757.9 kPa). A 15.4 milliliter aliquot (containing 0.01 millimole Ti) of a mixture of 5 milliliters of the above decanted catalyst, 0.50 milliliters of 640 millimolar triethylaluminum, and 45 milliliters of ISOPAR E TM is pressured into the reactor. The pressure is maintained at 400 psig (2757.9 kPa) by ethylene flow for 20 minutes. The polyethylene sample is collected and the ISOPAR TM E is flashed off under vacuum at 80° C. The dried polyethylene weighs 126 grams and has a melt index of 3.32 and an $I_{10}/I_2$ of 10.4. Catalyst efficiencies are 260,000 grams polyethylene/gram Ti; 51,400 grams polyethylene/gram Mg; 147,000 grams polyethylene/gram Al; and 13,700 grams polyethylene/gram Cl.

COMPARATIVE EXPERIMENT B

Catalyst Preparation

To a stirred vessel containing 807 grams hexane are added, sequentially, 114 grams of a 14.7% butylethylmagnesium solution in hexane, 61 grams of a 25.1% triisobutylaluminum solution in hexane, 25 grams n-propyl alcohol, 9 grams of a 50% tetraisopropoxy-titanium solution in hexane, and 747 grams of a 13.1% ethylaluminumdichloride solution in hexane. The temperature is held at 35° C. throughout the preparation. The molar ratio of ROH:R, i.e., total amount of alcohol per R groups attached to butylethylmagnesium and triisobutylaluminum is 0.78:1.0. Molar ratios of the components are 1.0 butylethylmagnesium to 0.50 triisobutylaluminum to 2.75 n-propyl alcohol to 0.10 tetraisopropoxy-titanium to 5.1 ethylaluminumdichloride. Elemental ratios are 1.0 Mg to 0.1 Ti to 5.6 Al to 10.2 Cl.

Polymerization of Ethylene

To a stirred 1-gallon stainless steel reactor is added 2 liters of dry, oxygen-free ISOPAR E TM. The pressure is adjusted to 2 psig (13.79 kPa) with hydrogen. The reactor contents are heated to 190° C. Ethylene is added to the reactor at 400 psig (2757.9 kPa). A 15.4 milliliter aliquot (containing 0.01 millimole Ti) of a mixture of 5 milliliters of the above non-decanted catalyst, 4.00 milliliters of 640 millimolar triethylaluminum, and 45 milliliters of ISOPAR E TM is pressured into the reactor. The pressure is maintained at 400 psig (2757.9 kPa) by ethylene flow for 20 minutes. The polyethylene sample is collected and the ISOPAR TM E is flashed off under vacuum at 80° C. The dried polyethylene weighs 107 grams and has a melt index of 3.39 and an $I_{10}/I_2$ of 9.0. Catalyst efficiencies are 223,000 grams polyethylene/gram Ti; 44,000 grams polyethylene/gram Mg; 7,200 grams polyethylene/gram Al; and 3,000 grams polyethylene/gram Cl.

EXAMPLE 3

Catalyst Preparation

To a stirred vessel containing 807 grams hexane are added, sequentially, 114 grams of a 14.7% butylethylmagnesium solution in hexane, 61 grams of a 25.1% triisobutylaluminum solution in hexane, 25 grams n-propyl alcohol, 9 grams of a 50% tetraisopropoxy-titanium solution in hexane, and 747 grams of a 13.1% ethylaluminumdichloride solution in hexane. The temperature is held at 35° C. throughout the preparation. The molar ratio of ROH:R, i.e., total amount of alcohol per R groups attached to butylethylmagnesium and triisobutylaluminum is 0.78:1.0. Molar ratios of the components are 1.0 butylethylmagnesium to 0.50 triisobutylaluminum to 2.75 n-propyl alcohol to 0.10 tetraisopropoxy-titanium to 5.1 ethylaluminumdichloride. Elemental ratios are 1.0 Mg to 0.1 Ti to 5.6 Al to 10.2 Cl. Two hundred ml of this catalyst are collected while it is being stirred, in a capped bottle previously purged with nitrogen. The hydrocarbon insoluble solids are allowed to settle in the bottle and approximately 100 ml of the supernatant solution is removed by decantation. The solids are reslurried with fresh hexane. The decantation procedure is repeated again to remove the hexane soluble reaction products.

Polymerization of Ethylene

To a stirred 1-gallon stainless steel reactor is added 2 liters of dry, oxygen-free ISOPAR E TM. The pressure is adjusted to 2 psig (13.79 kPa) with hydrogen. The reactor contents are heated to 190° C. Ethylene is added to the reactor at 400 psig (2757.9 kPa). A 15.4 milliliter aliquot (containing 0.01 millimole Ti) of a mixture of 5 milliliters of the above decanted catalyst, 1.02 milliliters of 640 millimolar triethylaluminum, and 45 milliliters of ISOPAR E TM is pressured into the reactor. The pressure is maintained at 400 psig (2757.9 kPa) by ethylene flow for 20 minutes. The polyethylene sample is collected and the ISOPAR TM E is flashed off under vacuum at 80° C. The dried polyethylene weighs 64 grams and has a melt index of 1.87 and an $I_{10}/I_2$ of 11.5. Catalyst efficiencies are 130,000 grams polyethylene/gram Ti; 25,700 grams polyethylene/gram Mg; 73,300 grams polyethylene/gram Al; and 6,900 grams polyethylene/gram Cl.

COMPARATIVE EXPERIMENT C

Catalyst Preparation

To a stirred vessel containing 807 grams hexane are added, sequentially, 114 grams of a 14.7% butylethylmagnesium solution in hexane, 61 grams of a 25 1% triisobutylaluminum solution in hexane, 25 grams n-propyl alcohol, 9 grams of a 50% tetraisopropoxy-titanium solution in hexane, and 747 grams of a 13.1% ethylaluminumdichloride solution in hexane. The temperature is held at 35° C. throughout the preparation. The molar ratio of ROH:R, i.e., total amount of alcohol per R groups attached to butylethylmagnesium and triisobutylaluminum is 0.78:1.0. Molar ratios of the components are 1.0 butylethylmagnesium to 0.50 triisobutylaluminum to 2.75 n-propyl alcohol to 0.10 tetraisopropoxy-titanium to 5.1 ethylaluminumdichloride. Elemental ratios are 1.0 Mg to 0.1 Ti to 5.6 Al to 10.2 Cl.

Polymerization of Ethylene

To a stirred 1-gallon stainless steel reactor is added 2 liters of dry, oxygen-free ISOPAR E TM. The pressure is adjusted to 2 psig (13.79 kPa) with hydrogen. The reactor contents are heated to 190° C. Ethylene is added to the reactor at 400 psig (2757.9 kPa). A 30.8 milliliter aliquot (containing 0.02 millimole Ti) of a mixture of 5 milliliters of the above non-decanted catalyst, 0.40 milliliters 640 of millimolar triethylaluminum, and 45 milliliters of ISOPAR E TM is pressured into the reactor. The pressure is maintained at 400 psig (2757.9 kPa) by ethylene flow for 20 minutes. The polyethylene sample is collected and the ISOPAR TM E is flashed off under vacuum at 80° C. The dried polyethylene weighs 118 grams and has a melt index of 3.04 and an $I_{10}/I_2$ of 8.3. Catalyst efficiencies are 123,000 grams polyethylene/gram Ti; 24,300 grams polyethylene/gram Mg; 4,000 grams polyethylene/gram Al; and 1,700 grams polyethylene/gram Cl.

EXAMPLE 4

Catalyst Preparation

To a stirred vessel containing 807 grams hexane are added, sequentially, 114 grams of a 14.7% butylethylmagnesium solution in hexane, 61 grams of a 25.1% triisobutylaluminum solution in hexane, 25 grams of n-propyl alcohol, 9 grams of a 50% tetraisopropoxy-titanium solution in hexane, and 747 grams of a 13.1% ethylaluminumdichloride solution in hexane. The temperature is held at 35° C. throughout the preparation. The molar ratio of ROH:R, i.e., total amount of alcohol per R groups attached to butylethylmagnesium and triisobutylaluminum is 0.78:1.0. Molar ratios of the components are 1.0 butylethylmagnesium to 0.50 triisobutylaluminum to 2.75 n-propyl alcohol to 0.10 tetraisopropoxy-titanium to 5.1 ethylaluminumdichloride. Elemental ratios are 1.0 Mg to 0.1 Ti to 5.6 Al to 10.2 Cl. Two hundred ml of this catalyst are collected while it is being stirred, in a capped bottle previously purged with nitrogen. The hydrocarbon insoluble solids are allowed to settle in the bottle and approximately 100 ml of the supernatant solution is removed by decantation. The solids are reslurried with fresh hexane. The decantation procedure is repeated again to remove the hexane soluble reaction products.

Polymerization of Ethylene

To a stirred 1-gallon stainless steel reactor is added 2 liters of dry, oxygen-free ISOPAR E ™. The pressure is adjusted to 2 psig (13.79 kPa) with hydrogen. The reactor contents are heated to 170° C. Ethylene is added to the reactor at 400 psig (2757.9 kPa). A 46.0 milliliter aliquot (containing 0.03 millimole Ti) of a mixture of 5 milliliters of the above decanted catalyst, 0.20 milliliters of 640 millimolar triethylaluminum, and 45 milliliters of ISOPAR E ™ is pressured into the reactor. The pressure is maintained at 400 psig (2757.9 kPa) by ethylene flow for 20 minutes. The polyethylene sample is collected and the ISOPAR ™ E is flashed off under vacuum at 80° C. The dried polyethylene weighs 171 grams and has a melt index of 6.71 and an $I_{10}/I_2$ of 9.7. Catalyst efficiencies are 120,000 grams polyethylene/gram Ti; 23,700 grams polyethylene/gram Mg; 67,700 grams polyethylene/gram Al; and 6,300 grams polyethylene/gram Cl.

COMPARATIVE EXPERIMENT D

Catalyst Preparation

To a stirred vessel containing 807 grams hexane are added, sequentially, 114 grams of a 14.7% butylethylmagnesium solution in hexane, 61 grams of a 25.1% triisobutylaluminum solution in hexane, 25 grams n-propyl alcohol, 9 grams of a 50% tetraisopropoxy-titanium solution in hexane, and 747 grams of a 13.1% ethylaluminumdichloride solution in hexane. The temperature is held at 35° C. throughout the preparation. The molar ratio of ROH:R, i.e., total amount of alcohol per R groups attached to butylethylmagnesium and triisobutylaluminum is 0.78:1.0. Molar ratios of the components are 1.0 butylethylmagnesium to 0.50 triisobutylaluminum to 2.75 n-propyl alcohol to 0.10 tetraisopropoxy-titanium to 5.1 ethylaluminumdichloride. Elemental ratios are 1.0 Mg to 0.1 Ti to 5.6 Al to 10.2 Cl.

Polymerization of Ethylene

To a stirred 1-gallon stainless steel reactor is added 2 liters of dry, oxygen-free ISOPAR E ™. The pressure is adjusted to 2 psig (13.79 kPa) with hydrogen. The reactor contents are heated to 190° C. Ethylene is added to the reactor at 400 psig (2757.9 kPa). A 7.7 milliliter aliquot (containing 0.005 millimole Ti) of a mixture of 5 milliliters of the above non-decanted catalyst, 0.40 milliliters 640 millimolar triethylaluminum, and 45 milliliters ISOPAR E ™ is pressured into the reactor. The pressure is maintained at 400 psig (2757.9 kPa) by ethylene flow for 20 minutes. The polyethylene sample is collected and the ISOPAR ™ E is flashed off under vacuum at 80° C. The dried polyethylene weighs 46 grams and has a melt index of 0.84 and an $I_{10}/I_2$ of 8.0. Catalyst efficiencies are 192,000 grams polyethylene/gram Ti; 37,900 grams polyethylene/gram Mg; 6,200 grams polyethylene/gram Al; and 2,600 grams polyethylene/gram Cl.

EXAMPLE 5

Catalyst Preparation

To a stirred vessel containing 807 grams hexane are added, sequentially, 114 grams of a 14.7% butylethylmagnesium solution in hexane, 61 grams of a 25.1% triisobutylaluminum solution in hexane, 25 grams n-propyl alcohol, 9 grams of a 50% tetraisopropoxy-titanium solution in hexane, and 747 grams of a 13.1% ethylaluminumdichloride solution in hexane. The temperature is held at 35° C. throughout the preparation. The molar ratio of ROH:R, i.e., total amount of alcohol per R groups attached to butylethylmagnesium and triisobutylaluminum is 0.78:1.0. Molar ratios of the components are 1.0 butylethylmagnesium to 0.50 triisobutylaluminum to 2.75 n-propyl alcohol to 0.10 tetraisopropoxy-titanium to 5.1 ethylaluminumdichloride. Elemental ratios are 1.0 Mg to 0.1 Ti to 5.6 Al to 10.2 Cl. Two hundred ml of this catalyst are collected while it is being stirred, in a capped bottle previously purged with nitrogen. The hydrocarbon insoluble solids are allowed to settle in the bottle and approximately 100 ml of the supernatant solution is removed by decantation. The solids are reslurried with fresh hexane. The decantation procedure is repeated again to remove the hexane soluble reaction products.

Polymerization of Ethylene

To a stirred 1-gallon stainless steel reactor is added 2 liters of dry, oxygen-free ISOPAR E ™. The pressure is adjusted to 2 psig (13.79 kPa) with hydrogen. The reactor contents are heated to 150° C. Ethylene is added to the reactor at 400 psig (2757.9 kPa). A 46.0 milliliter aliquot (containing 0.03 millimole Ti) of a mixture of 5 milliliters of the above decanted catalyst, 0.20 milliliters of 640 millimolar triethylaluminum, and 45 milliliters of ISOPAR E ™ is pressured into the reactor. The pressure is maintained at 400 psig (2757.9 kPa) by ethylene flow for 20 minutes. The polyethylene sample is collected and the ISOPAR ™ E is flashed off under vacuum at 80° C. The dried polyethylene weighs 155 grams and has a melt index of 2.97 and an $I_{10}/I_2$ of 11.0. Catalyst efficiencies are 110,000 grams polyethylene/gram Ti; 21,700 grams polyethylene/gram Mg; 62,000 grams polyethylene/gram Al; and 5,800 grams polyethylene/gram Cl.

COMPARATIVE EXPERIMENT E

Catalyst Preparation

To a stirred vessel containing 807 grams hexane are added, sequentially, 114 grams of a 14.7% butylethylmagnesium solution in hexane, 61 grams of a 25.1% triisobutylaluminum solution in hexane, 25 grams n-propyl alcohol, 9 grams of a 50% tetraisopropoxy-titanium solution in hexane, and 747 grams of a 13.1% ethylaluminumdichloride solution in hexane. The temperature is held at 35° C. throughout the preparation. The molar ratio of ROH:R, i.e., total amount of alcohol per R groups attached to butylethylmagnesium and triisobutylaluminum is 0.78:1.0. Molar ratios of the components are 1.0 butylethylmagnesium to 0.50 triisobutylaluminum to 2.75 n-propyl alcohol to 0.10 tetraisopropoxy-titanium to 5.1 ethylaluminumdichloride. Elemental ratios are 1.0 Mg to 0.1 Ti to 5.6 Al to 10.2 Cl.

Polymerization of Ethylene

To a stirred 1-gallon stainless steel reactor is added 2 liters of dry, oxygen-free ISOPAR E ™. The pressure is adjusted to 1 psig (13.79 kPa) with hydrogen. The reactor contents are heated to 190° C. Ethylene is added to the reactor at 400 psig (2757.9 kPa). A 15.4 milliliter aliquot (containing 0.01 millimole Ti) of a mixture of 5 milliliters of the above non-decanted catalyst, 0.40 milliliters of 640 millimolar triethylaluminum, and 45 milliliters of ISOPAR E ™ is pressured into the reactor. The pressure is maintained at 400 psig (2757.9 kPa) by ethylene flow for 20 minutes. The polyethylene sample is collected and the ISOPAR ™ E is flashed off under vacuum at 80° C. The dried polyethylene weighs 83 grams and has a melt index of 0.64 and an $I_{10}/I_2$ of 9.0. Catalyst efficiencies are 173,000 grams polyethylene/gram Ti; 34,200 grams polyethylene/gram Mg; 5,600 grams polyethylene/gram Al; and 2,300 grams polyethylene/gram Cl.

What is claimed is:

1. A process for polymerizing one or more α-olefins or one or more α-olefins and one or more polymerizable ethylenically unsaturated monomers which process comprises conducting the polymerization under solution polymerization conditions in the presence of the solid catalytic product resulting from removing the liquid components from the product resulting from admixing in an inert diluent and in an atmosphere which excludes moisture and oxygen
   (A) at least one hydrocarbon soluble organomagnesium compound;
   (B) at least one organic hydroxyl-containing compound;
   (C) at least one reducing halide (X) source;
   (D) at least one transition metal (Tm) alkoxide; and
   wherein
   (a) the components are added in the order (A), (B), (C) and (D) or (A), (B), (D) and (C); and
   (b) the components are employed in quantities so as to provide the following atomic ratios Mg:Tm of from about 0.1:1 to about 100:1; and X:Mg of from about 3:1 to about 20:1; and
   (c) the organic hydroxyl-containing compound is employed in a quantity such that for every metal atom present in component (A) there remains on the average not more than about 0.9 hydrocarbon group attached to such metal atoms.

2. A process of claim 1 wherein the components are employed in amounts which provide atomic ratios of Mg:Tm of from about 1:1 to about 40:1; X:Mg of from about 6:1 to about 20:1; and on the average, there is from about 0.3 to about 0.9 hydrocarbyl or hydrocarbyloxy group attached to a metal atom in the organomagnesium compound.

3. A process of claim 2 wherein the components are employed in amounts which provide atomic ratios of Mg:Tm of from about 5:1 to about 20:1; X:Mg of from about 8:1 to about 12:1; and on the average, there is from about 0.5 to about 0.9 hydrocarbyl or hydrocarbyloxy group attached to a metal atom in the organomagnesium compound.

4. A process of claim 1, 2, or 3 wherein (a) component (A) is a compound or mixture of compounds represented by the formula $R_2Mg \cdot xMeR'_{x'}$ wherein each R is independently a hydrocarbyl group and, a hydrocarbyl or a hydrocarbyloxy group; each R' is independently hydrogen, a hydrocarbyl or a hydrocarbyloxy group; Me is Al, Zn or B; x has a value from zero to about 10; and x' has a value equal to the valence of Me;

(b) component (B) is a compound or mixture of compounds represented by the formulas $R^a\text{-}(O\text{-}R^b\text{-})_n\text{-}OH$ or $Z((\text{-}O\text{-}R^b\text{-})_n\text{-}O\text{-}R^c)_{n'}$ wherein $R^a$ is a hydrocarbyl group having from 1 to about 20 carbon atoms; each $R^b$ is independently a divalent hydrocarbyl group having from 1 to about 20 carbon atoms; each $R^c$ is independently hydrogen or a hydrocarbyl group having from 1 to about 20 carbon atoms, at least one of which is hydrogen; Z is a multivalent organic group containing from 2 to about 10 carbon atoms; n has a value from zero to about 10; and n' has a value from 2 to about 10;

(c) component (C) is a compound or mixture of compounds represented by the formulas $Al(R^1)_{3-m}X_m$ or $B(R^1)_{3-m}X_m$ wherein each $R^1$ is independently hydrogen or a hydrocarbyl group having from 1 to about 20 carbon atoms; and m has a value from 1 to 2; and (d) component (D) is a compound or mixture of compounds represented by the formula

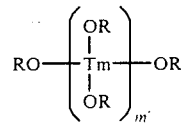

wherein Tm is a transition metal in its highest valence state and is selected from groups IV-B, V-B and VI-B of the Periodic Table of the Elements; R is a hydrocarbyl group having from 1 to about 20 carbon atoms; and m' has a value from 1 to about 20.

5. A process of claim 4 wherein (a) in Component (A), each R is an alkyl group having from 1 to about 20 carbon atoms; each R' is an alkyl group having from 1 to about 20 carbon atoms; Me is Al; x has a value from about 0.2 to about 5 and x' has a value of 3;

(b) component (B) is a compound represented by the formula $R^a\text{-}(O\text{-}R^b\text{-})_n\text{-}OH$ wherein $R^a$ is a hydrocarbyl group having from 1 to about 10 carbon atoms and n has a value of zero;

(c) component (C) is a compound represented by the formula $Al(R^1)_{3-m}X_m$ wherein $R^1$ is a hydrocarbyl group having from 1 to about 10 carbon atoms; and (d) in component (D), each R independently has from 1 to about 10 carbon atoms; Tm is Ti; and m' has a value from 1 to about 10.

6. A process of claim 5 wherein (a) component (A) is butylethylmagnesium·½triethylaluminum, di-n-butyl magnesium, ethyl-n-butylmagnesium, n-butyl-sec-butylmagnesium, di-n-hexylmagnesium, di-n-octylmagnesium, n-butylethylmagnesium·½triisobutylaluminum, or a combination thereof;

(b) component (B) is n-propyl alcohol, 2-pentanol, n-octyl alcohol or a combination thereof;

(c) component (C) is ethylaluminum dichloride, ethylaluminum sesquichloride, diethylaluminum chloride, or a combination thereof; and (d) component (D) is tetraisopropoxy titanium, tetra-n-butoxytitanium, tetra-(2-ethylhexoxy)titanium, or a combination thereof.

7. A process of claim 6 wherein (a) component (A) is butylethylmagnesium;
(b) component (B) is n-propyl alcohol;
(c) component (C) is ethylaluminum dichloride; and
(d) component (D) is tetraisopropoxy titanium.

8. A process for polymerizing one or more α-olefins or one or more α-olefins and one or more polymerizable ethylenically unsaturated monomers which process comprises conducting the polymerization under solution polymerization conditions in the presence of a catalyst prepared by (1) contacting (A) at least one organomagnesium compound with (B) at least one organic hydroxyl-containing compound by the slow addition of the organomagnesium compound and in a quantity such that for every metal atom present in component (A) there remains on the average not more than about 0.9 hydrocarbyl or hydrocarbyloxy group attached to such metal atoms;

(2) contacting the product resulting from step (1) with either one, but not both of (C) at least one reducing halide (X) source or (D) at least one transition metal (Tm) alkoxide; and (3) contacting the product resulting from step (2) with whichever component (C) or (D) was not employed in step (2); and wherein the components are employed in quantities corresponding to the atomic ratios of Mg:Tm of from about 0.1:1 to about 100:1; and X:Mg of from about 3:1 to about 20:1.

9. The process of claim 8 wherein the components are employed in amounts which provide atomic ratios of Mg:Tm from about 1:1 to about 40:1; X:Mg of from about 6:1 to about 20:1; and on the average, there is from about 0.3 to about 0.9 hydrocarbyl or hydrocarbyloxy group attached to a metal atom in the organomagnesium compound.

10. A process of claim 9 wherein the components are employed in amounts which provide atomic ratios of Mg:Tm of from about 5:1 to about 20:1; X:Mg of from about 8:1 to about 12:1; and on the average, there is not more than from about 0.5 to about 0.9 hydrocarbyl or hydrocarbyloxy group attached to a metal atom in the organomagnesium compound.

11. A process of claim 8, 9, or 10 wherein (a) component (A) is a compound or mixture of compounds represented by the formula $R_2Mg \cdot xMeR'_{x'}$ wherein each R is independently a hydrocarbyl group and, a hydrocarbyl or a hydrocarbyloxy group; each R' is independently hydrogen, a hydrocarbyl or a hydrocarbyloxy group; Me is Al, Zn or B; x has a value from zero to about 10; and x' has a value equal to the valence of Me;

(b) component (B) is a compound or mixture of compounds represented by the formulas $R^a$-$(O-R^b)_n$-OH or $Z((-O-R^b-)_n-O-R^c)_{n'}$ wherein $R^a$ is a hydrocarbyl group having from 1 to about 20 carbon atoms; each $R^b$ is independently a divalent hydrocarbyl group having from 1 to about 20 carbon atoms; each $R^c$ is independently hydrogen or a hydrocarbyl group having from 1 to about 20 carbon atoms, at least one of which is hydrogen; Z is a multivalent organic group containing from 2 to about 10 carbon atoms; n has a value from zero to about 10; and n' has a value from 2 to about 10;

(c) component (C) is a compound or mixture of compounds represented by the formulas $Al(R^1)_{3-m}X_m$ or $B(R^1)_{3-m}X_m$ wherein each $R^1$ is independently hydrogen or a hydrocarbyl group having from 1 to about 20 carbon atoms; and m has a value from 1 to 2; and (d) component (D) is a compound or mixture of compounds represented by the formula

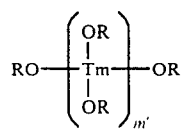

wherein Tm is a transition metal in its highest valence state and is selected from groups IV-B, V-B and VI-B of the Periodic Table of the Elements; R is a hydrocarbyl group having from 1 to about 20 carbon atoms; and m' has a value from 1 to about 20.

12. A process of claim 11 wherein (a) in Component (A), each R is an alkyl group having from 1 to about 20 carbon atoms; each R' is an alkyl group having from 1 to about 20 carbon atoms; Me is Al; x has a value from about 0.2 to about 5; and x' has a value of 3;

(b) component (B) is a compound represented by the formula $R^a$-$(O-R^b-)_n$-OH wherein $R^a$ is a hydrocarbyl group having from 1 to about 10 carbon atoms and n has a value of zero;

(c) component (C) is a compound represented by the formula $Al(R^1)_{3-m}X_m$ wherein $R^1$ is a hydrocarbyl group having from 1 to about 10 carbon atoms; and (d) in component (D), each R independently has from 1 to about 10 carbon atoms; Tm is Ti; and m' has a value from 1 to about 10.

13. A process of claim 12 wherein butylethylmagnesium·½triethylaluminum, di-n-butyl magnesium, di-n-butyl magnesium, ethyl-n-butylmagnesium, n-butyl-sec-butylmagnesium, di-n-hexylmagnesium, di-n-octylmagnesium, n-butyl-ethylmagnesium·½triisobutylaluminum, or a combination thereof;

(b) component (B) is n-propyl alcohol, 2-pentanol, n-octyl alcohol or a combination thereof;

(c) component (C) is ethylaluminum dichloride, ethylaluminum sesquichloride, diethylaluminum chloride, or a combination thereof; and (d) component (D) is tetraisopropoxy titanium, tetra-n-butoxytitanium, tetra-(2-ethylhexoxy)titanium, or a combination thereof.

14. A process of claim 13 wherein (a) component (A) is butylethylmagnesium;
(b) component (B) is n-propyl alcohol;
(c) component (C) is ethylaluminum dichloride; and
(d) component (D) is tetraisopropoxy titanium.

* * * * *

UNITED STATES PATENT AND TRADEMARK OFFICE
CERTIFICATE OF CORRECTION

PATENT NO. : 5,045,612

DATED : September 3, 1991

INVENTOR(S) : Joseph G. Schell, Jr., et al.

It is certified that error appears in the above-identified patent and that said Letters Patent is hereby corrected as shown below:

Column 14, line 10, change "formulas Ra-" to read --formulas $R^a$--.

Column 14, line 58, change "carbon atoms: Tm" to read --carbon atoms; Tm--.

Column 15, line 20, add --organic hydroxyl-containing compound to the-- before the word "organomagnesium".

Column 15, line 39, change "Mg:Tm from" to read --Mg:Tm of from--.

Column 15, line 61, change "(O-$R^b$)" to read --(O-$R^b$-)--.

Signed and Sealed this

Thirty-first Day of August, 1993

Attest:

BRUCE LEHMAN

Attesting Officer

*Commissioner of Patents and Trademarks*